(12) United States Patent
Thurman

(10) Patent No.: US 8,084,687 B1
(45) Date of Patent: Dec. 27, 2011

(54) ELECTRICAL OUTLET BOX ASSEMBLY

(76) Inventor: James P. Thurman, Richmond, VA (US)

( * ) Notice: Subject to any disclaimer, the term of this patent is extended or adjusted under 35 U.S.C. 154(b) by 321 days.

(21) Appl. No.: 12/583,435

(22) Filed: Aug. 21, 2009

(51) Int. Cl.
H02G 3/08 (2006.01)
(52) U.S. Cl. .............. 174/50; 174/58; 174/57; 174/480; 174/63; 174/61; 439/535; 248/343
(58) Field of Classification Search ............ 174/58, 174/57, 50, 61, 63, 480, 481; 439/535; 248/343, 248/68.1; 220/3.3, 4.02, 3.2, 3.8; 312/245
See application file for complete search history.

(56) References Cited

U.S. PATENT DOCUMENTS

| 6,533,225 | B1 * | 3/2003 | Berges et al. | 248/27.1 |
| 6,573,446 | B1 * | 6/2003 | Umstead et al. | 174/50 |
| 7,271,335 | B2 * | 9/2007 | Dinh | 174/58 |
| 7,479,598 | B1 * | 1/2009 | Shotey et al. | 174/58 |

* cited by examiner

Primary Examiner — Dhiru R Patel
(74) Attorney, Agent, or Firm — Norman B. Rainer

(57) ABSTRACT

An electrical box assembly is provided for enabling an electrical box to be rapidly installed into a metal framework that supports an interior wall of a building. The assembly includes a supporting member which is attached to the metal framework, and an electrical box of square design having paired outwardly directed flanges. The flanges are positioned to fit into receiving brackets on the supporting member, thereby enabling the electrical box to engage the supporting member by a simple downward sliding motion.

7 Claims, 4 Drawing Sheets

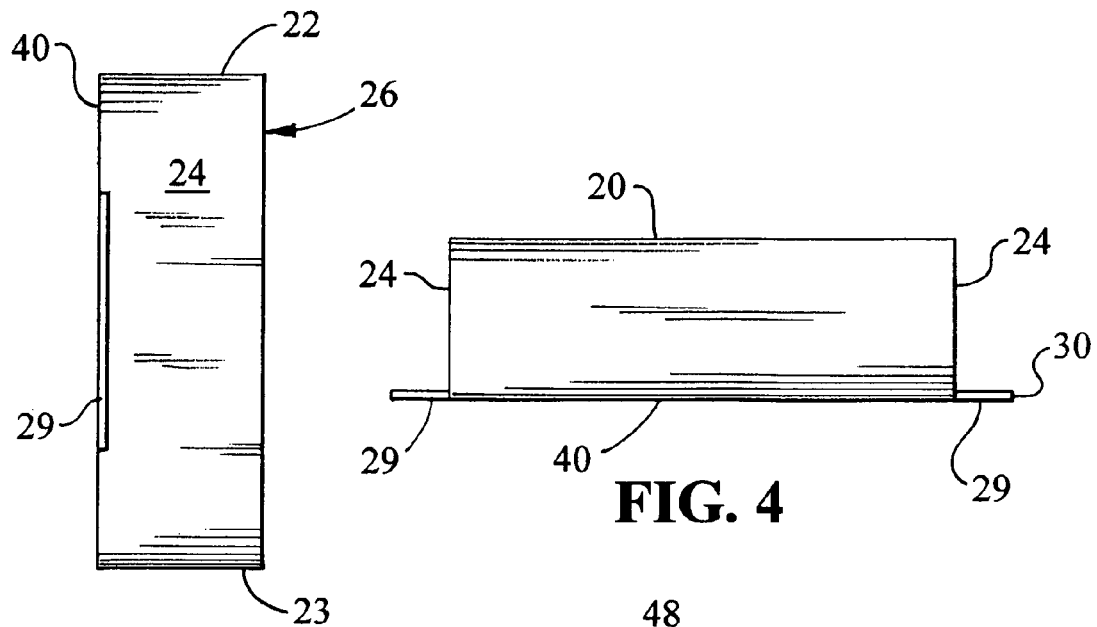
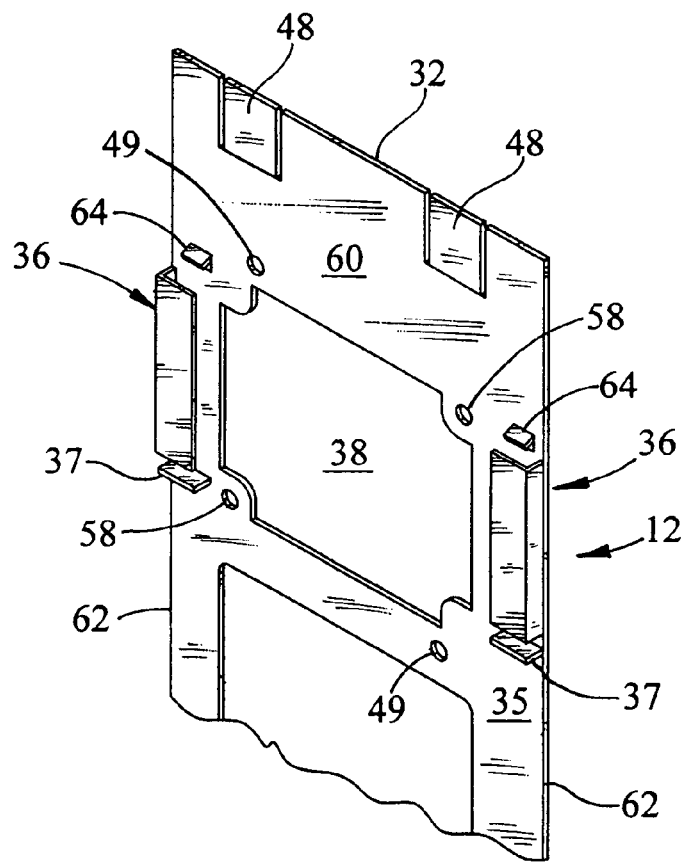

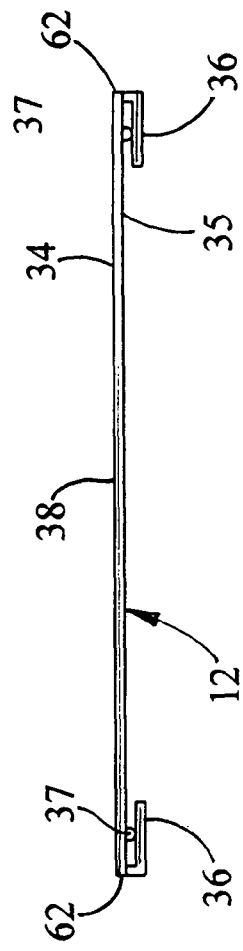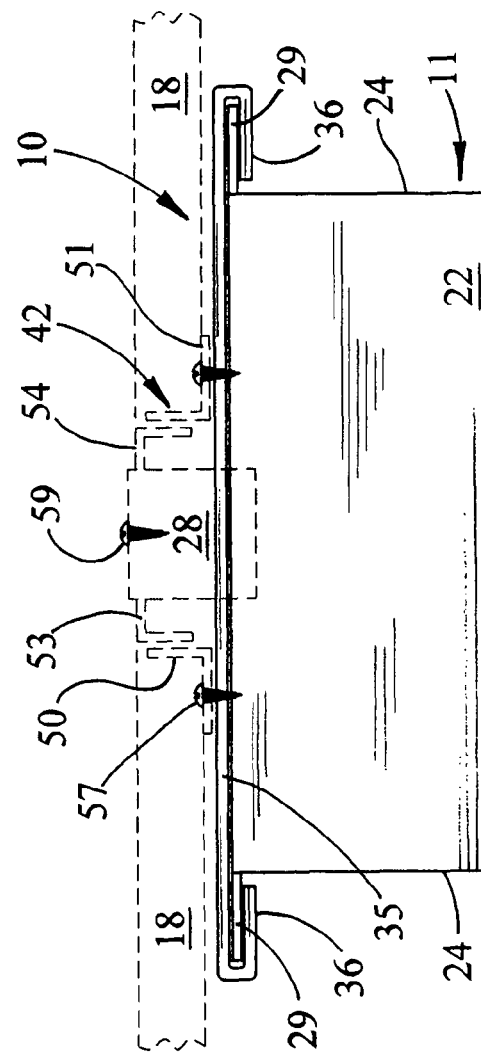

US 8,084,687 B1

ELECTRICAL OUTLET BOX ASSEMBLY

BACKGROUND OF THE INVENTION

1. Field of the Invention

This invention relates to electrical outlet boxes and box supports particularly adapted for installation into indoor walls comprised of metal support framework.

2. Description of the Prior Art

The walls of indoor rooms of buildings are generally constructed of front and rear flat rigid panels spaced four to six inches apart about a supporting framework comprised of upper and lower horizontal beams and a series of beams extending vertically between said horizontal beams. The wall space, namely the space between the panels, generally accommodates thermal insulation, plumbing components and electrical wiring. The wiring typically extends from a power source to outlet boxes which house electrical receptacles or switches.

The electrical outlet boxes are recessed into the wall space so as to fit flush with the exterior face of the associated front wall panel. In those instances where the supporting framework is of wooden construction, as is typical of residential dwellings, the outlet box is usually installed by nailing to an appropriate vertical beam at a measured height above the lower horizontal beam. The outlet boxes are generally installed either at a low location of about 18" above the associated floor, to accommodate plug-in receptacles that receive electrical cords, or are installed at a high location of about 53" above the floor to hold switches that control electrical circuits.

Commercial and industrial buildings predominantly employ metal wall-supporting frameworks instead of the wooden framework prevalent in residential buildings, and the panels are usually of gypsum board or equivalent fire-resistant materials. Said panels may be employed in varied thicknesses of between about ½" and 1½". The outlet boxes employed with metal wall systems are of substantially the same construction as outlet boxes employed for wooden wall structures, however, the manner of positioning and affixing the outlet box in metal wall systems is considerably different than techniques typically employed with wooden wall systems.

Most contractors use prefabricated components to reduce the amount of time required to install outlet/switch boxes in a commercial or industrial building. In a typical on-site installation, a commonplace metal outlet box of 4" or 4¹¹⁄₁₆" square size is attached with screws to a supporting panel. At low sites intended to receive plug-in receptacles, said supporting panel is of elongated shape, extending in attachment between the lower beam and a horizontal strut joined to contiguous vertical beams. The wires of a power cable are attached to the receptacle or switch within the box, and a "plaster ring" is attached to the supporting panel to cause the installation to fit flush with the exterior face of the wall. Such manner of installation is time-consuming because it requires the alignment of many pairs of holes and rotation of screws. In the course of construction of a new building which may require the installation of hundreds of outlet boxes, the cumulative working time is a significant economic factor.

It is accordingly an object of the present invention to provide an electrical outlet box assembly that can be rapidly and accurately installed.

It is another object of this invention to provide an electrical box assembly of the foregoing object which is compatible with standard components of metal wall frameworks.

These objects and other objects and advantages of the invention will be apparent from the following description.

SUMMARY OF THE INVENTION

The above and other beneficial objects and advantages are accomplished in accordance with the present invention by an electrical box assembly for installation into a wall-supporting metal framework, said assembly comprising:

a) an electrical box of metal construction having a base panel of square perimeter with upper and lower walls and paired side walls orthogonally emergent from said perimeter and terminating in straight distal edges in coplanar association defining a square portal forwardly directed from said base panel in parallel relationship thereto and defining therewith a box-like square compartment, the distal edge of each of said side walls having an elongated flange outwardly directed from said compartment within the plane of said square portal and terminating in a straight edge parallel to the associated distal edge, and b) a supporting member fabricated of sheet metal and having:
  1) a flat panel portion bounded by upper and lower extremities, forward and rearward faces, and opposed side edges,
  2) means to facilitate attachment to said metal framework,
  3) a pair of spaced-apart elongated brackets on said rearward face in vertical orientation positioned to securely accept in downwardly sliding fashion the flanges of said electrical box,
  4) abutment stop means below said brackets to limit the downward sliding motion of said electrical box, and
  5) a receiving aperture positioned between said brackets and having a size and shape to align with the square portal of said outlet box in its lowermost position within said brackets.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a side view of the outlet box component of FIG. 2.

FIG. 4 is a top view of the outlet box component of FIG. 2.

FIG. 5 is a fragmentary perspective rear view of an embodiment of the supporting member of the assembly of this invention.

FIG. 6 is a top view of the supporting member of FIG. 5.

FIG. 7 is a top view of the exemplified assembly with accessory prior art components shown in phantom outline.

DESCRIPTION OF THE PREFERRED EMBODIMENT

Figure 1:
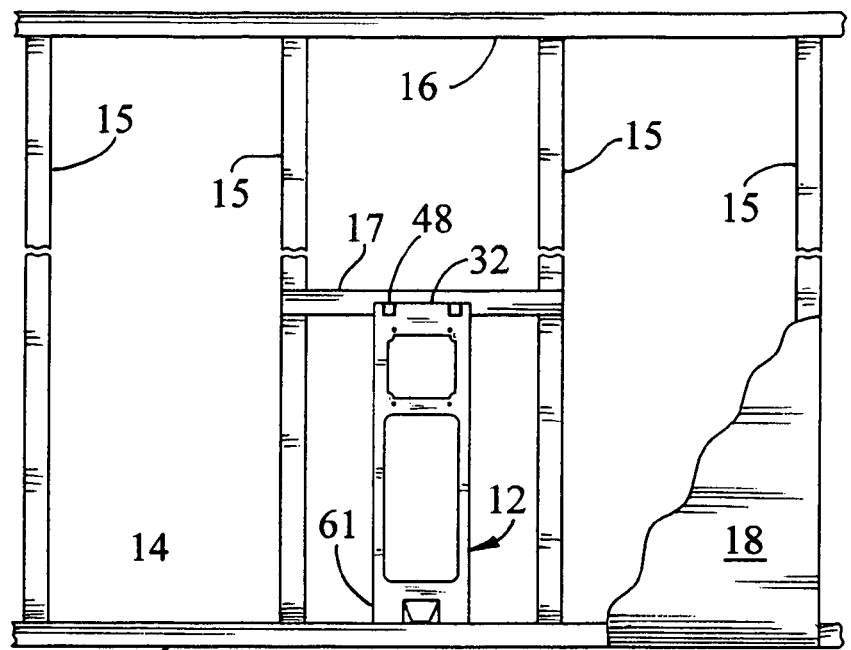
FIG. 1 is a fragmentary front view of a structural wall employing a prior art metal framework that would utilize the outlet box assembly of the present invention.
Figure 2:
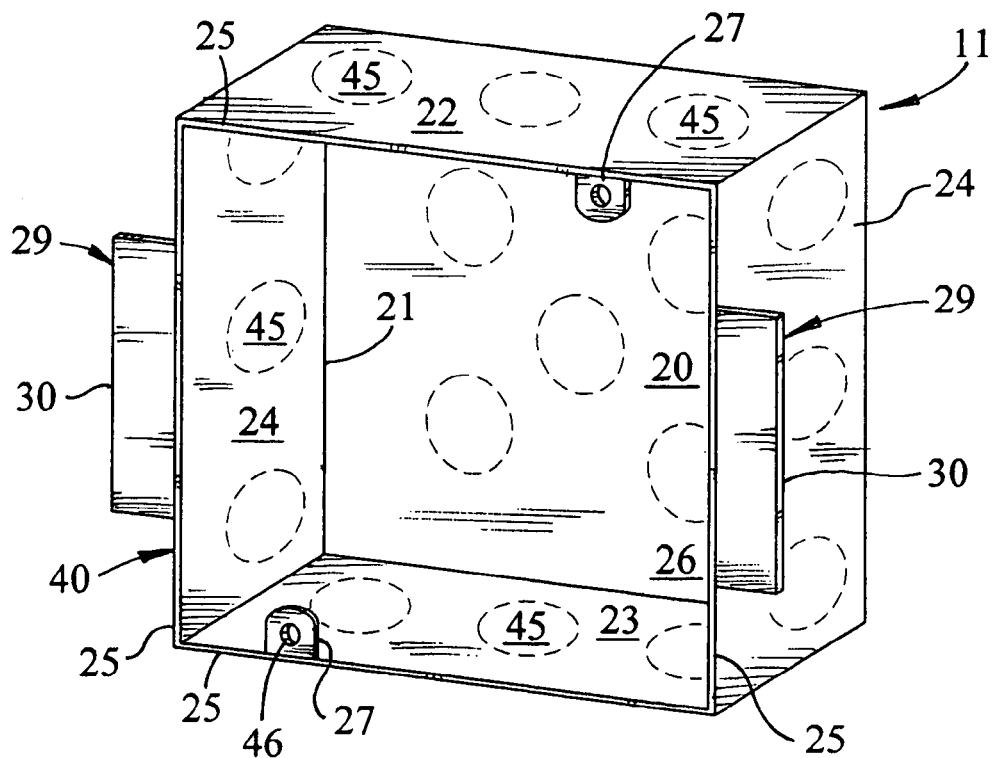
FIG. 2 is a perspective front view of an embodiment of the outlet box component of the assembly of this invention.

Referring now to FIGS. 1-8, an embodiment of the electrical outlet box assembly 10 of the present invention is shown comprised of an electrical outlet box component 11, and interactive supporting member 12. The assembly is designed for installation into a wall-supporting metal framework 13.

Framework 13 is comprised of a metal floor channel 14, vertical studs 15 interactive with said floor channel at standardized distances of separation, and header channel 16 interactive with the upper extremities of studs 15. Said framework components are generally fabricated of galvanized steel. At selected intervals, rigid transverse struts 17 span contiguous studs in attachment therewith. The height of said struts above the floor channel is such as to permit installation of an electrical outlet box intended to house receptacles which accommodate plug-in electrical cords. Strut 17 secures the uppermost extremity 32 of a supporting member 12 which extends vertically upward from securement with floor channel 14. Wall panels 18, which may be gypsum in thicknesses of 1/4" to 1 1/2", are secured to the forward surfaces of the aforesaid structural components of the framework.

Outlet box 11 is constructed of galvanized steel sheet stock by way of fabricating techniques such as bending, pressing, stamping and/or welding. It has a base panel 20 having a square perimeter 21 of 4 inches or larger. Upper and lower skirting walls 22 and 23, respectively, and paired side skirting walls 24 are orthogonally emergent from said perimeter and terminate in distal edges 25 in coplanar association, defining a square portal 40 forwardly spaced by about 1 1/2 to 2 1/8 inches from base panel 20. A box-like square compartment 26 is thereby defined. In some embodiments, said distal edges may have one or more opposed paired tabs 27 directed toward the interior of said compartment within the plane of said portal, each tab containing a threaded hole 46. Said tabs, intended to facilitate other installation methods, may be in paired alignment either parallel to said skirting walls or in diagonal relationship therewith. Various punch-out circles 45 are provided in base panel 20 and said skirting walls to facilitate entry of electrical cables or conduits. For the purpose of clarity of illustration, said punch-out circles are not shown in views subsequent to FIG. 2.

The distal edge of each side wall 24 has an elongated flange 29 outwardly directed from said compartment within the plane of said portal, and terminating in a straight edge 30 which is parallel to the associated distal edge. The width of flange 29, measured between wall 24 and edge 30 is between about 5 and 20 millimeters. The flange is either a separate piece which is welded to wall 24, or is integral with said wall 24, as having been made by a bending, stamping or pressing operation. The length of said flange may range between one inch and the full 4" or larger length of the associated side wall 24.

Supporting member 12 is fabricated of rigid sheet metal stock, and has a flat panel portion 60 bounded by upper and lower extremities, 32 and 61, respectively, forward and rearward faces, 34 and 35, respectively, and opposed side edges 62. Attachment means such as gripping ears 48 or screw-receiving holes are associated with upper extremity 32 to facilitate engagement with transverse strut 17. The exemplified supporting member is designed to extend between floor channel 14 and transverse strut 17 at a proper height for the installation of a low level outlet box. Alternative embodiments of supporting member 12 may be designed for securement to an upright stud 15 at a greater height for installation of a high level outlet box intended to house a conventional switch.

Rearward face 35 of supporting member 12 has a pair of spaced apart elongated brackets 36 in vertical orientation positioned to accept in downwardly sliding fashion flanges 29 of outlet box 11. Abutment stop means 37 located below brackets 36 limit the downward-sliding motion of said outlet box. Brackets 36 are unitary pieces of metal closely spaced from rearward face 35 and comprised of either attached pieces or integral extensions of said supporting member, having been formed by a bending, pressing, or stamping operation. Supplemental locking means, exemplified as punch-formed tab 64, may be incorporated into rearward face 35 above brackets 36 to prevent inadvertent upward removal of outlet box 11 from supporting member 12. The interactively contacting surfaces of flanges 29 and brackets 36 may be provided with gripping means such as interlocking indentations for enhanced securement of outlet box 11 to supporting member 12.

A receiving aperture 38, located between brackets 36, is configured to have a size and shape to substantially align with portal 40 of outlet box 11 in its lowermost position within said brackets. The size of aperture 38 is designed to be adequate to facilitate access to all regions of compartment 26 of said outlet box. Supporting member 12 may also have holes 49 adapted to align with threaded holes 46 of tabs 27 for the purpose of providing additional securement by way of threaded fasteners in the manner of prior art assembly methods. Supplemental threaded holes 58 are diagonally located about aperture 38.

Figure 8:
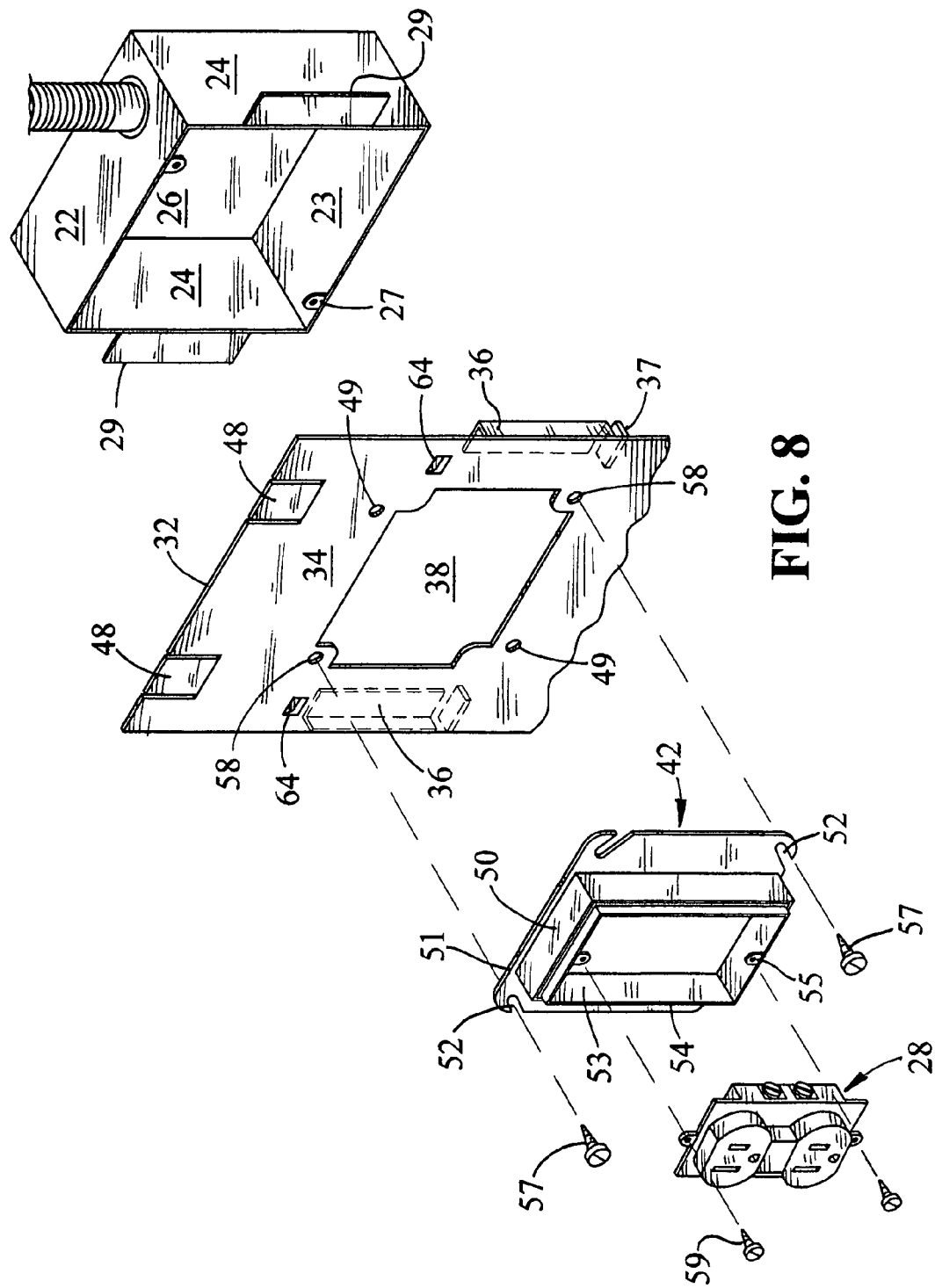
FIG. 8 is an exploded perspective view of the exemplified assembly shown with accessory prior art components.

In the course of installing electrical outlet boxes into walls having an exterior panel layer such as gypsum board, a component called a "plaster ring" 42 is associated with forward face 34 of supporting member 12 for the purpose of causing an electrical receptacle 28 to fit flush with the outer surface of gypsum board 18. As shown in FIGS. 7 and 8, plaster ring 42 has an outwardly projecting barrier wall 50 of vertically elongated rectangular contour surrounded by a flat mounting apron 51 having slotted corners 52. The height of barrier wall 50 may be effectively adjusted by way of a slidably secured insert sleeve 53. The forwardmost portion of said sleeve has a rim 54 parallel to apron 51 and is provided with opposed upper and lower threaded tabs 55.

In the installation process, outlet box 11 is slid into engagement with supporting member 12. Plaster ring 42 is then secured to the forward face 34 of said supporting member by way of screws 57 that engage diagonal slotted corners 52 and supplemental holes 58. Appropriate electrical wires are attached to electrical receptacle 28, and said receptacle is attached to rim 54 by way of bolts 59 interactive with tabs 55.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An electrical box assembly for installation into a wall supporting metal framework, said assembly comprising:
   a) an electrical box of metal construction having a base wall with upper and lower walls and a pair of side walls orthogonally emergent from said base wall and terminating in straight distal extremities in coplanar association, defining a square portal forwardly directed from said base wall and further defining a box-like square compartment, the distal extremity of each of said side walls having an elongated flange outwardly directed from each of said side walls within the plane of said portal and terminating in a straight edge parallel to the associated distal extremity of each of said side walls, and b) a supporting member fabricated of sheet metal and having:
1) a flat panel portion bounded by upper and lower extremities, forward and rearward faces, and opposed side edges,
2) means to facilitate attachment to said metal framework,
3) a pair of spaced-apart elongated brackets on said rearward face in vertical orientation positioned to securely accept in downwardly sliding fashion the flanges of said electrical box,
4) abutment stop means below said brackets to limit the downward sliding motion of said electrical box, and
5) a receiving aperture positioned between said brackets and having a size and shape to align with the square portal of said outlet box in its lowermost position within said brackets.

2. The electrical box assembly of claim 1 wherein said flanges have a width of between 5 and 20 millimeters.

3. The electrical box assembly of claim 2 wherein each of said flanges has a length between one inch and the length of each of said side walls.

4. The electrical box assembly of claim 3 further provided with gripping means interactive between said flanges and said brackets.

5. The electrical box assembly of claim 3 wherein said flanges are continuous integral extensions of each of said side walls.

6. The electrical box assembly of claim 3 wherein said brackets are continuous integral extensions of said flat panel portion.

7. The electrical box assembly of claim 3 wherein the forward face of said flat panel portion of said supporting member is further provided with means for receiving a plaster ring.

* * * * *